(12) United States Patent
Kashyap et al.

(10) Patent No.: US 8,972,979 B2
(45) Date of Patent: Mar. 3, 2015

(54) CONFIGURATION OF VIRTUAL APPLIANCES

(75) Inventors: Vivek Kashyap, Beaverton, OR (US); Scott S. Moser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 13/070,543

(22) Filed: Mar. 24, 2011

(65) Prior Publication Data
US 2012/0246639 A1 Sep. 27, 2012

(51) Int. Cl.
*G06F 9/455* (2006.01)
*G06F 9/445* (2006.01)

(52) U.S. Cl.
CPC ........ *G06F 9/45558* (2013.01); *G06F 9/44505* (2013.01)
USPC ............................................................ 718/1

(58) Field of Classification Search
None
See application file for complete search history.

(56) References Cited

U.S. PATENT DOCUMENTS

| | | |
|---|---|---|
| 2008/0034364 A1 | 2/2008 | Lam et al. |
| 2009/0172662 A1 | 7/2009 | Liu |
| 2009/0204961 A1 | 8/2009 | DeHaan et al. |
| 2009/0282404 A1* | 11/2009 | Khandekar et al. ............... 718/1 |
| 2010/0306772 A1* | 12/2010 | Arnold et al. ..................... 718/1 |
| 2011/0154331 A1* | 6/2011 | Ciano et al. ....................... 718/1 |
| 2011/0213886 A1* | 9/2011 | Kelkar et al. .................. 709/226 |
| 2011/0258622 A1* | 10/2011 | Burckart et al. .................. 718/1 |
| 2011/0265164 A1* | 10/2011 | Lucovsky et al. ................. 726/7 |
| 2012/0167090 A1* | 6/2012 | Hui et al. .......................... 718/1 |
| 2012/0174100 A1* | 7/2012 | Burckart et al. .................. 718/1 |

OTHER PUBLICATIONS

Open Virtualization Format Specification, Jan. 12, 2010, Version 1.1.0.*
"Migrating Hyper-V Virtual Machines Using Import/Export," www.virtuatopia.com, Sep. 2009.

* cited by examiner

*Primary Examiner* — Emerson Puente
*Assistant Examiner* — Dong Kim
(74) *Attorney, Agent, or Firm* — Lieberman & Brandsdorfer, LLC (57) ABSTRACT

Embodiments of the invention relate to post-install configuration of virtual appliances in a virtual machine. A packaging and distribution format is provided with two tools to support the configuration of the virtual machine. The first tool is employed to support configuration of the virtual machine, and employs an activation script during a boot operation. The second tool is employed by a call from the first tool. The second tool configures a virtual application in communication with the virtual machine with use of a configuration script. The configuration script is separate from the activation script and disassociated from an image binary of the virtual machine. The disassociation of the configuration script from the activation script supports changes to the configuration script without affecting the image binary.

24 Claims, 4 Drawing Sheets

CONFIGURATION OF VIRTUAL APPLIANCES

BACKGROUND

This invention relates to configuration of virtual appliances in a virtual machine operating in a virtual computing environment. More specifically, the invention relates to isolating the activation and configuration scripts, and their associated functionality, to enable post-install configuration of a virtual appliance.

A virtual machine is a self contained operating environment that behaves as if it is a separate computer, while allowing the sharing of underlying physical machine resources between multiple virtual machines. Each virtual machine operates as a whole machine, while a host of the virtual machine(s) manages resources to support each virtual machine. For example, a virtual machine consists of CPUs, memory, and I/O slots that are a subset of a pool of available resources within a computer system. Each of the virtual machines within the computer system is capable of running a version of an operating system or a specific set of application workloads.

A virtual appliance is a virtual machine image file that includes a pre-configured operating system and a single application. It is packaged as a pre-installed system image for a particular virtualized environment and hardware platform. A common file format for the virtual appliance is the open virtualization format (OVF). In one embodiment, an OVF package may include multiple virtual appliances, with an appliance have one or more applications. Deploying a new virtual appliance requires copying the appliance image, including the operating system and application, to a pre-installed and pre-configured virtual machine. Accordingly, the virtual appliance is a software image containing an application designed to run inside a virtual machine.

BRIEF SUMMARY

This invention comprises a method, system, and article for configuration of virtual appliances on a virtual machine.

In one aspect of the invention, a method is provided for post-install configuration of one or more virtual appliances. Both first and second activation tools are provided to support the configuration. The tools are part of a packaging and distribution format for a virtual machine and are both in communication with memory. The second tool is appliance specific. A processor is provided to support functionality of the first tool to configure the virtual machine. The first tool calls the second tool to configure each application in the virtual appliance. In one embodiment, the first tool is in the form of an activation script instantiated during boot operation, and the second tool is a set of configuration scripts per application that are then called by the activation script. The configuration script is independent of the activation script and disassociated from the image binary of the virtual machine.

In another aspect of the invention, a computer system is provided with a file system having at least one virtual machine. First and second activation tools are provided as part of a packaging and distribution format for the virtual machine, wherein the second activation tool is appliance specific. A processor is provided in communication with the first activation tool. More specifically, the processor supports the first activation tool to configure the virtual machine with an activation startup script during a boot operation. The first activation tool calls the second activation tool, which includes a configuration script for a virtual appliance. The configuration script is independent of the activation startup script and disassociated from the image binary of the virtual machine.

In yet another aspect of the invention, a computer program product is provided with a computer readable storage medium having embodied computer readable program code. More specifically, computer readable program code is provided to define first and second activation tools as a part of a packaging and distribution format for a virtual machine. The second activation tool is appliance specific. Computer readable code is provided for the first activation tool to configure the virtual machines with an activation startup script during a boot operation. Similarly, computer readable code is provided for the first activation tool to call the second activation tool having a configuration script for a virtual appliance application. More specifically, the configuration script is independent of the activation startup script and disassociated from an image binary of the virtual machine.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as tools. A tool may be implemented in programmable hardware devices such as field programmable gate arrays, programmable array logic, programmable logic devices, or the like. The tool may also be implemented in software for processing by various types of processors. An identified tool of executable code may, for instance, comprise one or more physical or logical blocks of computer instructions which may, for instance, be organized as an object, procedure, function, or other construct. Nevertheless, the executables of an identified tool need not be physically located together, but may comprise disparate instructions stored in different locations which, when joined logically together, comprise the tool and achieve the stated purpose of the tool.

Indeed, a tool of executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a tool, script, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

An application included within a virtual appliance requires installation of activation and configuration scripts. In one embodiment, a script is a list of commands that can be executed to support a function. The installation of the activation script pertains to configuration of the virtual machine on boot. The installation of the configuration scripts pertains to configuration of an appliance application, hereinafter referred to as an application, for a specific product. The activation script is a part of the virtual machine image binary. However, the configuration script does not need to be a part of the image binary. Separation of the configuration script from the activation script enables and supports the configuration script to be modified or augmented independent of the binary. Accordingly, application installation procedures remain unchanged while allowing for changes and customization of the configuration script independent of the activation script.

OVF is one form of a packaging and distribution format for a virtual machine giving customer vendor and platform independent. The invention is not limited to implementation with use of OVF. For illustrative purposes, OVF will be used as one example of a packaging and distribution format. Customers can deploy an OVF formatted virtual machine on a virtualization platform of their choice. A software virtual appliance is one or more virtual machines that collectively provide a specific function for a user through the services of a virtualization platform. The virtualization platform is the software executing on a physical machine that manages and runs virtual machines. The OVF standardizes the description and format of virtual image appliances. At the core of OVF is an envelope element including a product section that specifies product information for an appliance, such as name of product, name of product vendor, product version, URL resolving to product description, URL resolving to vendor description, URL resolving to deployed product instance, display icon for product, and a property bag of name/value pairs that allow for additional configuration parameters specific to the particular product.

Applications included within virtual appliances may require post install configuration. To enable the customization, the configuration framework must not be embedded or hardcoded within the virtual machine binary as this would not support post-install configuration. An OVF specification has a mechanism to include the configuration parameters and a transport mechanism, such as a virtual CD-ROM, to transfer these parameters to the booting virtual machine. In one embodiment, the virtual CD-ROM includes a replication of the contents of a CD-ROM on a hard disk, thereby eliminating the need for a physical CD-ROM. Files on the virtual CD-ROM are more accessible, faster, and convenient than on the actual CD-ROM. The virtual CD-ROM includes more than a mere copy of the compact disk files onto a hard drive. More specifically, the virtual CD-ROM replicates the behavior of the actual CD-ROM without the need for loading the CD-ROM in a physical CD-ROM drive, which requires waiting for content loading. In one embodiment of the invention, OVF specification includes activation scripts. The activation scripts can to be modified, or augmented independent of the virtual machine binary. A standardized mechanism for inclusion of the activation scripts is provided. In one embodiment, an activation startup script is provided in conjunction with an application specific configuration script. Similarly, in another embodiment, the configuration scripts may be included as a file-reference in OVF descriptor but with a configuration tag in a product section. In yet another embodiment, the configuration scripts may be included in the virtual CD-ROM that is created from the product section. The application specific startup scripts are separated from the virtual machine binary allowing for changes and customization independent of the virtual machine binary.

A standardized startup script can be included in the basic operating system (OS) distribution. The activation startup script sets the OS configuration of the virtual machine, such as IP address, hostname etc. and then calls each of the application scripts with an environment xml as an argument. The application startup script therefore can create or modify the application configuration files. The system then continues to boot normally.

Figure 1:
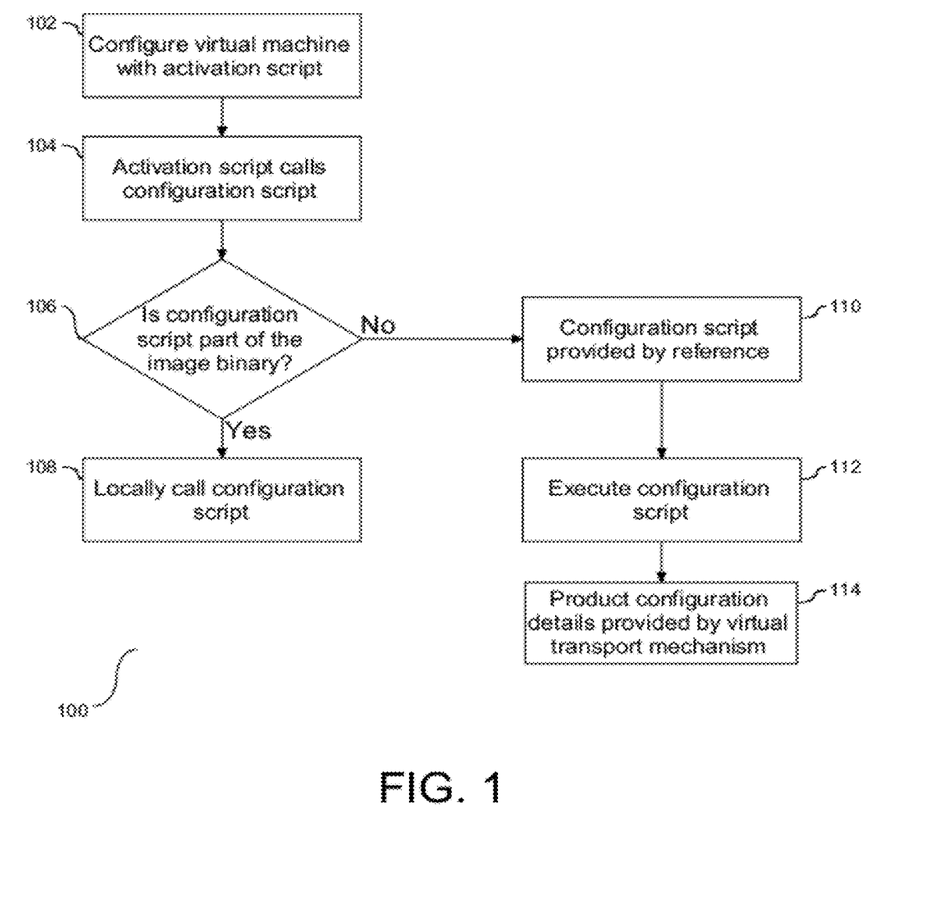
FIG. 1 is a flow chart illustrating the relationship and order of processing of the activation and configuration scripts.

FIG. 1 is a flow chart (100) illustrating a process for configuration of a virtual machine and an application for processing on the virtual machine. As shown, the virtual machine is configured with its activation script (102), which runs during the initial boot operation of the virtual machine. In one embodiment, the activation script is within the virtual machine binary image. To support configuration of the application on the virtual machine, the activation script calls the application configuration script (104), hereinafter referred to as the configuration script. In one embodiment, the configuration script is not a part of the virtual machine image binary. Following step (104), it is determined if the configuration script is a part of the virtual machine image binary (106). A positive response to the determination at step (104) is an indication that the configuration script is included in the image binary and thus enables the application script to call the configuration script from the image binary (108). However, a negative response to the determination at step (104) is an indication that the configuration script is not included in the image binary. More specifically, the negative response indicates the placement of the configuration script external to the image binary and requires a call by the application script outside of the image binary. The configuration script may be embedded in a manner that supports a call from the image binary or a call outside of the image binary. In one embodiment, the activation script is run when the system boots. Accordingly, during the boot process, the activation script looks for and reads the virtual machine configuration data information to complete the virtual machine configuration.

As noted at step (104), the configuration script may be external to the image binary. In one embodiment, the configuration script may be located in the virtual CD-ROM having been copied there by a deployment tool. More specifically, the application configuration script is included in the OVF description. When the OVF file is parsed, OVF tooling copies the binary, the configuration data, and application specific data (in the product section of OVF), to the virtual CD-ROM. Accordingly, in one embodiment, the configuration script may have been copied to the virtual CD-ROM from the product section location of the configuration script in the virtual CD-ROM. Similarly, in one embodiment, the configuration script may be in the OVF packaging files and copied to the virtual CD-ROM from these files.

With respect to the remote call, the configuration script is provided to the application script by reference (110). In one embodiment, the configuration script and product configuration details are introduced by the virtual transport mechanism. Similarly, in one embodiment, the configuration script is provided as a reference in metadata of the packaging and distribution format for the virtual machine. Regardless of the embodiment employed for referencing the configuration script, the configuration script is disassociated from the activation script. The configuration script is executed by the activation script (112). The configuration script takes the product configuration details provided by the virtual transport mechanism as input to configure the virtual system (114).

By independently locating the configuration script from the activation script, the configuration script is separated from the image binary. This allows the configuration script to be modified or augmented independent of the image binary. A packaging and distribution format for a virtual machine is employed to support the activation and configuration scripts. In one embodiment, the packaging and distribution format is an open virtualization format (OVF).

The description that follows is based upon the support of the OVF format, however, the invention should not be limited to this format, as other packaging and distribution formats may be employed. With OVF, an activation file may be provided, with the activation file referencing at least one virtual disk containing an operating system and an application, a description of a list of appliance parameters and associated identifier, and a configuration tag embedded in a product section of an OVF descriptor. In one embodiment, the configuration script can have an implementation independent of the activation script, wherein the configuration script searches for configuration data. For example, the configuration script may be written to look for its own product data based upon an identifier, string, etc., when the configuration script is invoked from the activation script.

Figure 2:
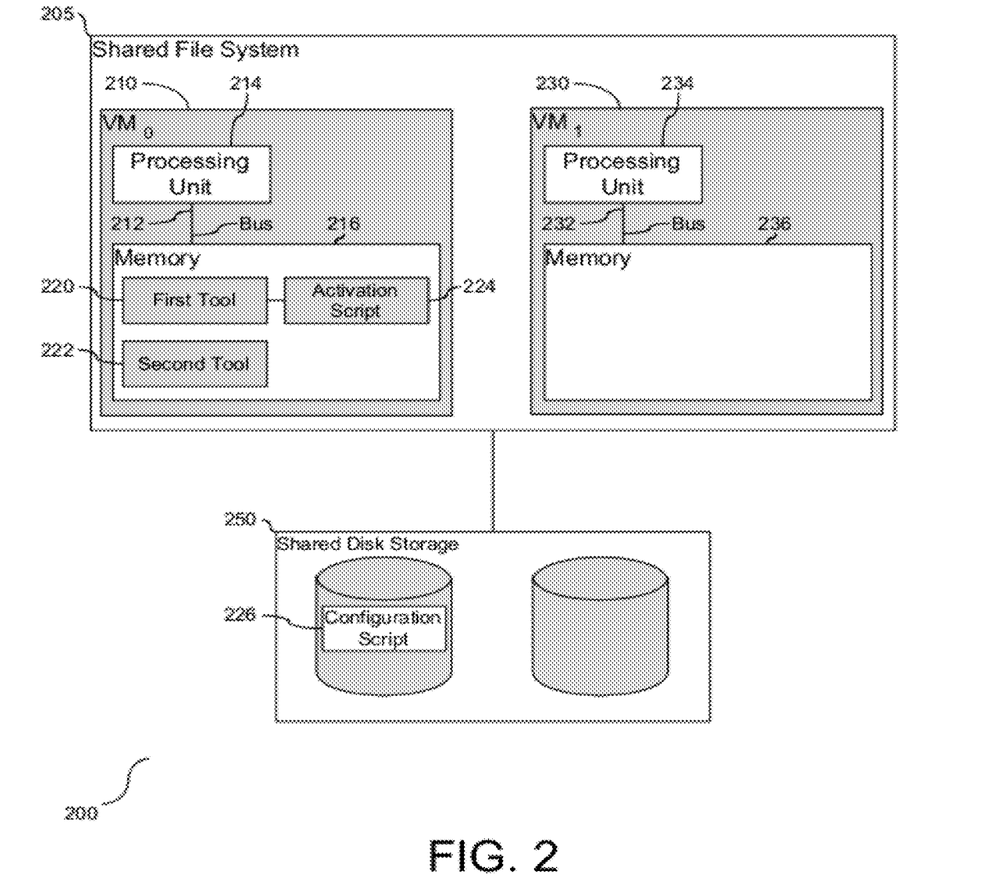
FIG. 2 is a block diagram illustrating elements of the tools employed in a packaging and distribution format.

FIG. 2 is a block diagram (200) showing a system having two virtual machines (210) and (230) operating in a shared file system (205). Virtual machines are configured using both an activation startup script during a boot operation of the virtual machine, and a configuration script to configure a virtual appliance application supported by the virtual machine. A virtual file system may employ one or more virtual machines. In the example shown here, two virtual machines (210) and (230) are in communication with shared disk storage (250). Each of the virtual machines (210) and (230) can access the shared storage or look for data blocks in caches of other virtual machines. The first virtual machine (210) is provided with a processing unit (214) in communication with memory (216) across a bus (212), and the second virtual machine (230) is provided with a processing unit (234) in communication with memory (236) across a bus (232).

First and second activation tools (220) and (222) are provided local to the first virtual machine (210). In one embodiment, the first and second activation tools (220) and (222) are provided local to memory (216). Similarly, in one embodiment, the first and second activation tools (220) and (222) are a portion of a packaging and distribution format for the virtual machine (210). With support of the processor (214), the first activation tool (220) configures the virtual machine (210) with an activation startup script (224) during a boot operation. To enable configuration of a virtual appliance (not shown), the first activation tool (220) calls the second activation tool (222). More specifically, the second activation tool (222) calls a configuration script (226) to configure the virtual appliance (not shown). As shown, the configuration script (226) is a separate element from the activation script (224). In one embodiment, the configuration script is included in a virtual transport mechanism external to the image binary. In the embodiment illustrated herein, the configuration script (226) is local to the shared disk storage (250). The configuration script (226) is not associated with an image binary of the virtual machine (210). The disassociation of the configuration script from the image binary supports amendment of the configuration script (226) independent of the image binary. In one embodiment, the second tool (222) is employed to amend the configuration script (226) prior to boot.

Figure 3:
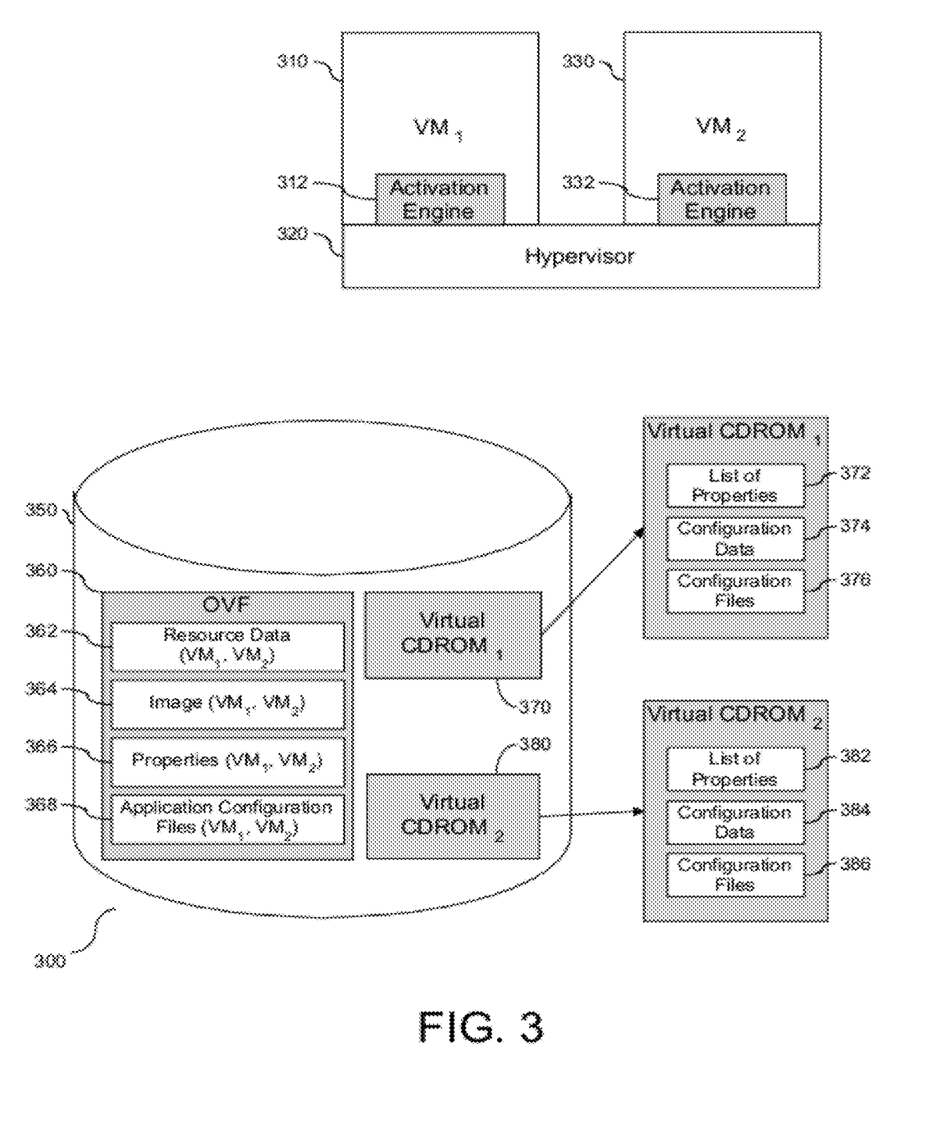
FIG. 3 is a block diagram illustrating elements of the tools employed in an open virtualization format.

As described above in reference to FIG. 1, the packaging and distribution format employed to support the first and second activation tools (220) and (222), respectively, may be in the form of an open virtualization format (OVF). FIG. 3 is a block diagram showing system elements to support post-install configuration of one or more virtual appliances with use of OVF. Similar to the system of FIG. 2, a system (300) is shown having two virtual machines (310) and (330) operating in communication with a hypervisor (320). A hypervisor, also known as a virtual machine manager, is a program that allows multiple operating systems to share a single hardware host. Each operating system appears to have the host's processor, memory, and other resources all to itself. However, the hypervisor is actually controlling the host processor and resources, allocating what is needed to each operating system in turn and making sure that the guest operating systems (called virtual machines) cannot disrupt each other.

Virtual machines are configured using both an activation file supporting an activation script during a boot operation of the virtual machine, and a configuration file to support a configuration script to configure a virtual appliance application supported by the virtual machine. As shown, each of the virtual machines (310) and (330) has an activation engine (312) and (332), respectively. In one embodiment, the activation engine is referred to as the activation tool. The virtual machines (310) and (330) are in communication with data storage (350) having an OVF file (360). More specifically, the OVF file (360) has data for the virtual machines (310) and (330), including resource data (362), image data (364), and property data (366), as well as configuration files (368). The OVF has various properties that will need to be configured, either with data from a user at instantiation, or it embedded.

The OVF tooling, i.e. the activation engines (312) and (332) will use information in the OVF file (360) to instantiate the virtual machines (310) and (330). More specifically, the OVF tooling copies the properties (366) and configuration files (368) to a separate file that is made available to the virtual machines as a virtual CD-ROM. As shown herein, there is a separate virtual CD-ROM (370) and (380) for each of virtual machines (310) and (330), respectively. With support of the OVF tooling, virtual CD-ROM (370) is shown with a list of properties (372), configuration data (374) and configuration files (376) to support virtual machine (310), and virtual CD-ROM (380) is shown with a list of properties (382), configuration data (384) and configuration files (386) to support virtual machine (330). At the time of boot, the activation engine (312) and (332) of the virtual machine (310) and (330), respectively, looks for the virtual CD-ROM (370) and (380), respectively, to find the configuration files (376), (386), respectively. Accordingly, in the OVF supported tooling, the configuration files are located in the respective virtual CD-ROM having been copied there by the activation engine.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to a flowchart illustration and/or block diagrams of methods, apparatus (systems) and computer program products according to embodiments of the invention. It will be understood that each block of the flowchart illustration and/or block diagrams, and combinations of blocks in the flowchart illustration and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
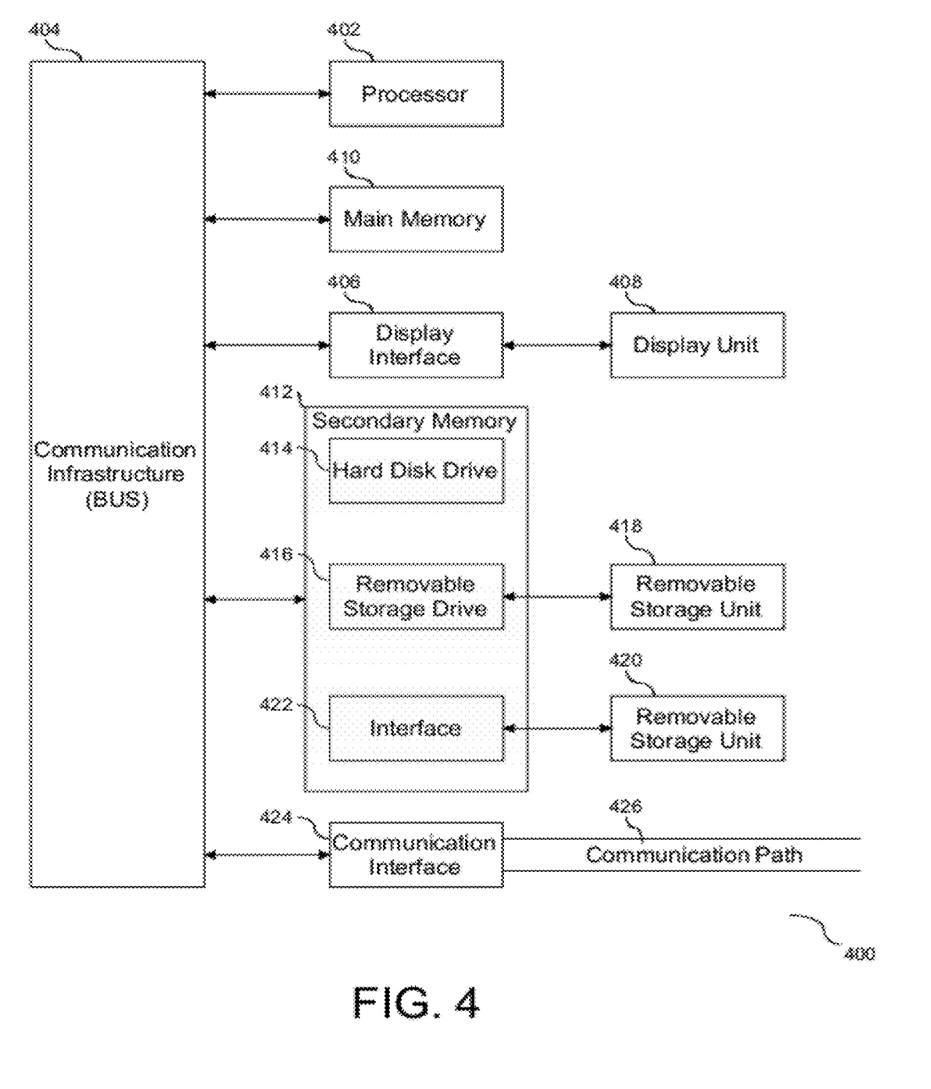
FIG. 4 is a block diagram showing a system for implementing an embodiment of the present invention.

Referring now to FIG. 4 is a block diagram (400) showing a system for implementing an embodiment of the present invention. The computer system includes one or more processors, such as a processor (402). The processor (402) is connected to a communication infrastructure (404) (e.g., a communications bus, cross-over bar, or network). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by removable storage drive (416). As will be appreciated, the removable storage unit (418) includes a computer readable medium having stored therein computer software and/or data. In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) are in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels. In this document, the terms "computer program medium, "computer usable medium," and "computer readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. In one embodiment, the first tool and the configuration scripts may be in the image binary. Similarly, in another embodiment, the configuration scripts may be in a secondary location from where they are copied to the virtual CD-ROM. The secondary location includes the following: the OVF envelope (metadata) as files, the product section, and a network location. With respect to the network location aspect, the configuration scripts may be provided as a reference from where they are downloaded and with support of tooling copied to the virtual CD-ROM. Accordingly, the scope of protection of this invention is limited only by the following claims and their equivalents.

We claim:

1. A method for a post-install configuration of virtual appliances comprising:
   providing a first activation tool and a second activation tool as a portion of a packaging and distribution format for a virtual machine in communication with memory, the second activation tool being virtual appliance specific;
   a processor in communication with the first activation tool, the first activation tool configuring the virtual machine with an activation startup script during a boot operation; and
   responsive to determining a configuration script is not included in an image binary, the first activation tool remotely invoking by reference the configuration script for a virtual appliance application, the configuration script is independent of the activation startup script and disassociated from the image binary of the virtual machine, wherein the invoking causes the configuration script to look for product data of the configuration script.

2. The method of claim 1, wherein the disassociation of the configuration script from the image binary supporting amendment of the configuration script independent of the image binary.

3. The method of claim 1, further comprising the second activation tool searching for product specific information.

4. The method of claim 1, wherein the packing and distribution format is an open virtualization format (OVF), and further comprising embedding a file reference to the configuration script in an OVF descriptor.

5. The method of claim 4, further comprising the OVF having an activation file, the activation file referencing at least one virtual disk containing an operating system and an application, a description of a list of appliance parameters and associated identifiers, and an embedded configuration tag in a product section of the OVF descriptor.

6. The method of claim 1, further comprising including the configuration script in a virtual transport mechanism external to the image binary.

7. The method of claim 1, further comprising the activation startup script setting operating system configuration of the virtual machine, including an internet protocol (IP) address and a host name for said virtual machine.

8. The method of claim 1, further comprising the second tool amending the configuration script prior to boot.

9. The method of claim 1, further comprising specifying the second activation tool as a reference in metadata of the packaging and distribution format for the virtual machine.

10. A system comprising:
 a file system having at least one virtual machine;
 a first activation tool and a second activation tool as a portion of a packaging and distribution format for a virtual machine in communication with memory, the second activation tool being appliance specific;
 a processor in communication with the first activation tool, the first activation tool to configure a virtual machine with an activation startup script during a boot operation; and
 responsive to determining a configuration script is not included in an image binary, the first activation tool to remotely invoke by reference the configuration script for a virtual appliance application, the configuration script is independent of the activation startup script and disassociated from the image binary of the virtual machine, wherein the invoking causes the configuration script to look for product data of the configuration script.

11. The system of claim 10, wherein the disassociation of the configuration script from the image binary supports amendment of the configuration script independent of the image binary.

12. The system of claim 10, further comprising the second activation tool to search for product specific information.

13. The system of claim 10, wherein the packing and distribution format is an open virtualization format (OVF), and further comprising an embedded file reference to the configuration script in an OVF descriptor.

14. The system of claim 13, further comprising the OVF having an activation file, the activation file to reference at least one virtual disk containing an operating system and an application, a description of a list of appliance parameters and associated identifiers, and an embedded configuration tag in a product section of the OVF descriptor.

15. The system of claim 10, further comprising the configuration script included in a virtual transport mechanism external to the image binary.

16. A computer program product, the computer program product comprising a hardware computer readable storage device having computer readable program code embodied therewith, the computer readable program code comprising:
 computer readable program code configured to define a first activation tool and a second activation tool as a portion of a packaging and distribution format for a virtual machine in communication with memory, the second activation tool being appliance specific;
 computer readable code for the first activation tool to configure the virtual machine with an activation startup script during a boot operation; and
 responsive to determining a configuration script is not included in an image binary, computer readable code for the first activation tool to remotely invoke by reference the configuration script for a virtual appliance application, the configuration script is independent of the activation startup script and disassociated from the image binary of the virtual machine, wherein the invoking causes the configuration script to look for product data of the configuration script.

17. The computer program product of claim 16, wherein the disassociation of the configuration script from the image binary supports amendment of the configuration script independent of the image binary.

18. The computer program product of claim 16, further comprising computer readable code for the second activation tool searching for product specific information.

19. The computer program product of claim 16, wherein the packing and distribution format is an open virtualization format (OVF).

20. The computer program product of claim 19, further comprising computer readable code to embed a file reference to the configuration script in an OVF descriptor.

21. The computer program product of claim 20, further comprising computer readable code for the OVF having an activation file, the activation file to reference at least one virtual disk containing an operating system and an application, a description of a list of appliance parameters and associated identifiers, and an embedded configuration tag in a product section of the OVF descriptor.

22. The computer program product of claim 16, further comprising computer readable code for including the configuration script in a virtual transport mechanism external to the image binary.

23. The computer program product of claim 16, further comprising computer readable code for the activation startup script to set operating system configuration of the virtual machine, including an internet protocol (IP) address and a host name for said virtual machine.

24. The computer program product of claim 16, further comprising computer readable code for specifying the second activation tool as a reference in metadata of the packaging and distribution format for the virtual machine.

* * * * *